Figure 1:
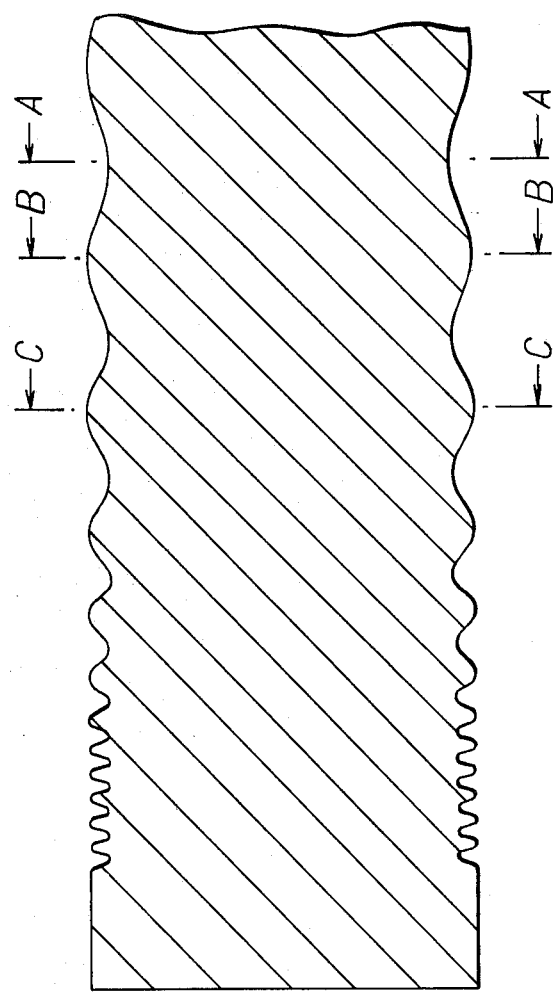

United States Patent [19]

Thomas

[11] 4,363,616

[45] Dec. 14, 1982

[54] MACHINE AND PART THEREFOR

[75] Inventor: David H. Thomas, Middlesbrough, England

[73] Assignee: Imperial Chemical Industries Limited, London, England

[21] Appl. No.: 803,781

[22] Filed: Jun. 6, 1977

[30] Foreign Application Priority Data

Jun. 18, 1976 [GB] United Kingdom ............... 25348/76
Nov. 29, 1976 [GB] United Kingdom ............... 49621/76

[51] Int. Cl.³ .............................................. B29D 7/14
[52] U.S. Cl. .................................... 425/339; 264/286; 425/369; 425/385
[58] Field of Search ............... 425/336, 369, 370, 385, 425/373, 374; 264/286; 29/121.1, 121.8

[56] References Cited

U.S. PATENT DOCUMENTS

| 304,417 | 9/1884 | Fletcher | 425/369 |
| 2,809,392 | 10/1957 | Armstrong | 425/385 |
| 3,220,057 | 11/1965 | Walton | 425/369 X |
| 3,419,937 | 1/1969 | Bally | 425/369 |
| 3,548,757 | 12/1970 | Verheij | 425/373 X |
| 3,859,027 | 1/1975 | Messner | 425/DIG. 235 |

Primary Examiner—Mark Rosenbaum
Attorney, Agent, or Firm—Cushman, Darby & Cushman

[57] ABSTRACT

The invention includes a sheet moulding machine and a roller for use with the machine. The roller is wave-shaped along its longitudinal axis and/or is cut with one or more longitudinal grooves. This roller is located in the sheet moulding machine together with an adjacent co-operating surface such as a flat-surfaced roller. The moulding composition is extruded between the rollers.

16 Claims, 4 Drawing Figures

B-B

A-A

C-C

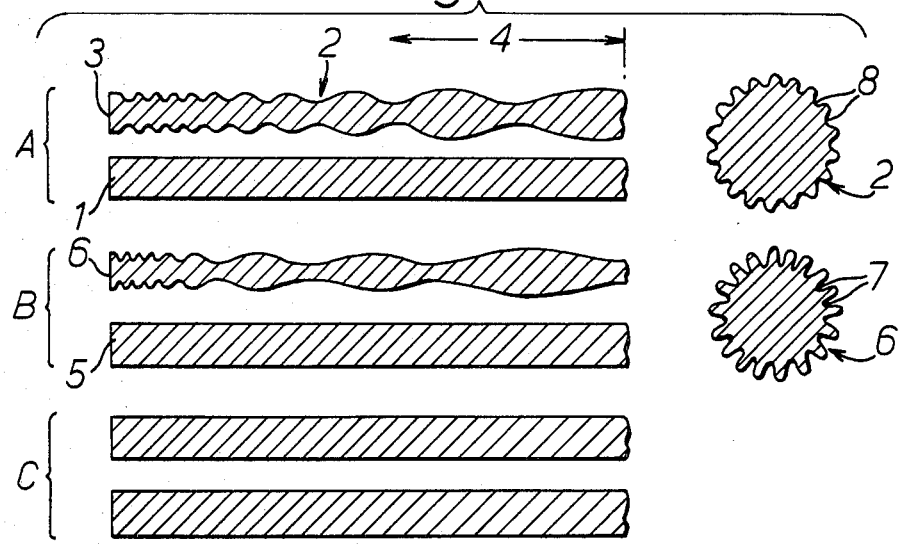
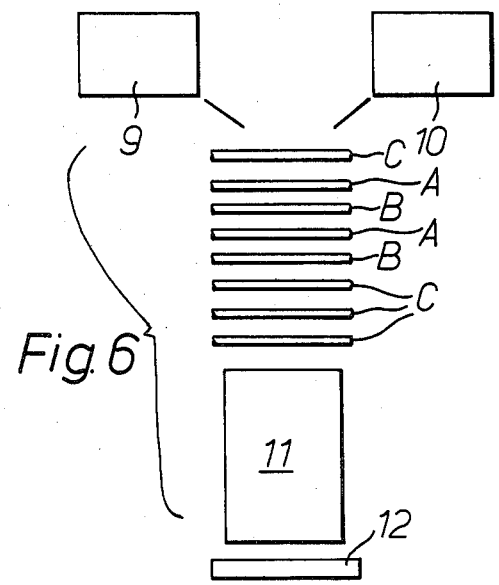

MACHINE AND PART THEREFOR

The present invention relates to a sheet moulding machine and in particular to a roller of novel shape for use in a sheet moulding machine.

Sheet moulding machines are primarily used in the plastics industry to form uncured or partially cured mouldable plastic into sheets. At the same time a reinforcing agent such as glass fibres may also be incorporated. A problem arising in this operation is to ensure that the glass fibres are uniformly dispersed throughout the plastic sheet, i.e. the avoidance of local centres of high glass and low resin or low glass and high resin concentration which can give rise to structural weaknesses and surface inperfections in the finished sheet.

According to this invention a sheet moulding machine comprises at least one roller and adjacent cooperating surface located so that sheet is able to be extruded between the roller and the surface, the surface of the roller being wave-shaped along at least part of its longitudinal axis and/or being cut with one or more grooves substantially parallel to the longitudinal axis.

The adjacent cooperating surface is preferably provided by a roller of conventional, i.e. flat surfaced, shape but it may be a flat surface such as a moving belt. The space between the roller and the adjacent surface is preferably adjustable to allow for varying thicknesses of sheet. This may be achieved by making either roller or adjacent surface or both movable in respect to the other.

By wave-shaped we mean that the surface may be conventionally undulated in shape or that it may be castellated, i.e. a square-wave shape. The wave lengths preferably decrease progressively from the mid-point of the longitudinal axis of the roller at least part, and preferably all, of the way towards each end. Generally the progression is symmetrical about the midpoint of the longitudinal axis, i.e. the waves, their lengths and amplitudes are the same on both sides of the midpoint, and to prevent the moulding composition being squeezed from the edge of the sheet it is beneficial for the last few (eg. 2 to 6) waves at each end of the roller to have relatively short, and preferably substantially the same, wavelengths. The number of waves on each side of the midpoint depends on the size of the sheet moulding machine and hence the length of the roller. Usually the roller is formed so that the wavelengths lie in the range 0.1 to 30 times the length of any glass fibre or analogous reinforcing agent which is to be used in the machine, the number of waves then depending on the length of the roller.

The grooves which may be cut either in a flat or waviform surfaced roller are substantially parallel to the longitudinal axis of the roller, "substantially" in this context meaning that the grooves are preferably parallel with, but may be at an acute angle to, the longitudinal axis. If the groove(s) are cut in a roller of waviform surface it is preferred that the depth of each groove(s) is equal to the amplitude of the wave in which it is cut. In such a roller of waviform surface it is preferred that contiguous grooves are axially aligned, i.e. one groove may run in effect continuously through two or more waves. Generally there are a number of grooves in the roller, e.g. 5 to 200 preferably 10 to 100 grooves and preferably they are disposed across the midpoint of the roller extending up to two thirds, more preferably up to one third, of the distance from the midpoint of the longitudinal axis towards each end of the roller. A preferred roller for use in the machine according to the invention is wave-shaped along its longitudinal axis, the wave-lengths decreasing progressively from the mid point of the axis towards each end and at least one but preferable more than one of the waves being cut with one or more grooves substantially parallel to the longitudinal axis of the roller to a depth equal to the amplitude of the waves.

The invention includes both a roller wave shaped along its longitudinal axis as hereinbefore described and a sheet moulding machine incorporating the roller and a method of making sheets by use of the machine. Apart from the roller the features of the sheet moulding machine are the same as those conventionally in use, e.g. the plastic and reinforcement are fed together with a backing material such as polyethylene sheet through one or more sets of rollers and then on to a conveyor belt before being rolled up for storage. The machine may have more than one pair of rollers and each pair may include one roller in accordance with the present invention. The most effective results are obtained using at least two pairs of rollers in which one roller in each pair is waviform as described above and in which the waves of one roller are in substantial axial alignment with the troughs of the other roller and vice versa. In this way the composition is more efficiently "kneaded".

The present invention is particularly useful in the moulding of unsaturated polyester resin compositions ie. resins comprising an ethylenically unsaturated polyester, e.g. a polyester made from propylene glycol, maleic acid and a phthalic acid and a copolymerisable monomer, e.g. styrene. These resins are generally reinforced with fibre, e.g. glass fibre to form a flexible sheet which can be cured e.g. thermally to give a rigid final product. By use of a machine according to the invention the glass fibres may be aligned parallel to the longitudinal axis of the sheet (waviform roller), parallel to the transverse axis of the sheet (grooved roller) or isotropically (waviform and grooved roller). Furthermore the fibre can be disposed evenly throughout sheets of varying thicknesses e.g. a 0.5 inch sheet with rollers of 6 mm wave amplitude or a 1.0 inch sheet with rollers of 12 mm wave amplitude. In general the thicker the sheet the greater the amplitude of the waves and/or the greater the depth of the grooves, the amplitude of the waves of any given roller being substantially constant.

Figure 2:
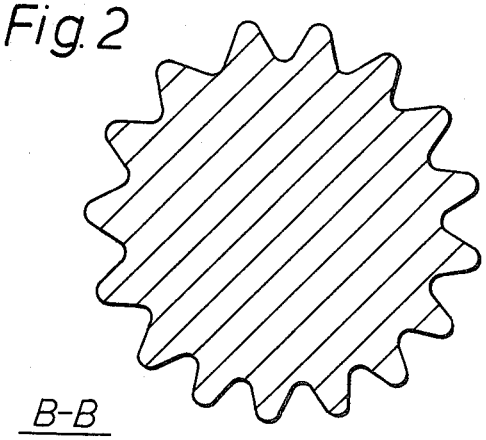
Figure 3:
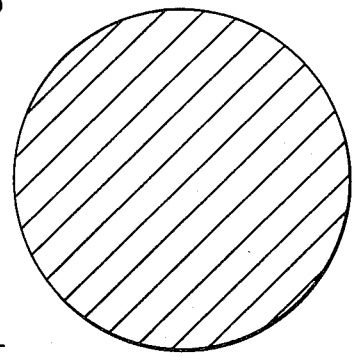
Figure 4:
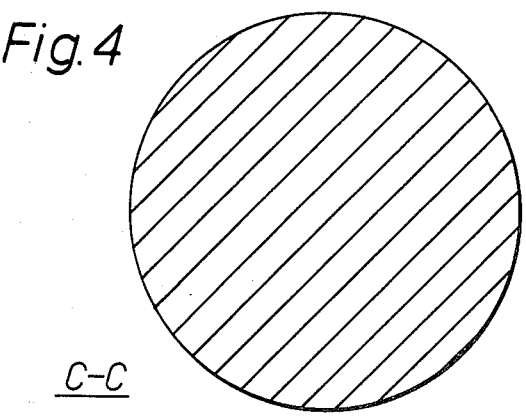

The invention will now be further described with reference to the following drawings in which FIG. 1 is a longitudinal section from the mid-point to one end of a roller according to the invention and FIGS. 2, 3 and 4 are transverse sections through the roller at three points A, B and C in FIG. 1.

FIG. 1 shows the wave formation along the longitudinal axis which is characteristic of a preferred roller according to the invention while the transverse section in FIG. 2 through the crest of a wave enables the longitudinal grooves to be seen. The grooves are cut only as deep as the amplitude of the wave so there is no indication of grooving in the transverse section through a trough in FIG. 3. Finally, the grooves extend only a part of the distance from the mid-point of the roller to each end so the section through a crest in FIG. 4 again reveals no sign of grooving.

FIG. 5 shows longitudinal and transverse sections through three pairs of rollers A, B and C which are in turn combined in a sheet moulding machine shown in FIG. 6.

Pair A in FIG. 5 comprises one conventional smooth surfaced roller (1) and one roller according to the invention (2). The latter has a wave shaped surface symmetrical about the mid-point of the longitudinal axis. The waves have an amplitude of 6 mm and from the end (3) the first four waves have a wavelength of 0.5 cm followed by waves of length 0.8, 1.19, 1.78, 2.68, 4 and a half-wave of 3 cms respectively. 18 grooves (8) are cut in the waves along the longitudinal axis of the roller to a depth equal to the wave amplitude. The grooves are symmetrically disposed around the circumference of the roller and extend (4) on each side of the mid-point one third of the distance along the longitudinal axis of the roller.

Pair B in FIG. 5 comprises one conventional smooth surfaced roller (5) and one roller according to the invention (6). The latter is the same length as roller 2 but has waves of amplitude 3 mm and wavelength from the end to the middle of 0.5, 0.5, 0.5, 0.67, 1.0, 1.5, 2.24, 3.34 and 5.0 cms respectively. The roller also has 18 grooves (7) arranged as in roller (2).

The pair of rollers C in FIG. 5 consists of two conventional flat surfaced rollers.

A sheet moulding machine using the pairs of rollers described in FIG. 5 is shown in FIG. 6. An unsaturated polyester resin composition 9 is fed in conventional fashion with chopped glass fibre to a series of pairs of rollers in the sequence shown, the crests of the waves of roller A being in substantial axial alignment with the troughs of the waves of roller B and vice versa. The resultant sheet moulding compositions leaves the last pair of rollers on conveyor belt 11 and is wound onto drum 12 for storage and transport.

I claim:

1. A sheet moulding machine comprising at least one roller and adjacent cooperating surface located so that sheet is able to be extruded between the roller and the surface, the surface of the roller being wave-shaped along at least part of its longitudinal axis, the wave lengths decreasing progressively from the mid-point of the longitudinal axis at least part of the way towards each end of the roller and the waves having substantially constant amplitude.

2. A sheet moulding machine according to claim 1 in which the progressive decrease in wavelength towards each end of the roller is symmetrical about the midpoint of the longitudinal axis.

3. A sheet moulding machine according to claim 2 in which the waves at each end of the roller have substantially the same wavelength.

4. A sheet moulding machine as recited in claim 1 wherein the roller is cut with one or more grooves substantially parallel to its longitudinal axis.

5. A sheet moulding machine according to claim 4 in which the roller is cut with 5 to 200 grooves.

6. A sheet moulding machine according to claim 4 in which contiguous grooves are axially aligned.

7. A sheet moulding machine according to claim 4 in which the groove(s) are disposed across the mid-point of the roller extending up to two thirds of the distance from the mid-point of the longitudinal axis towards each end of the roller.

8. A sheet moulding machine according to claim 1 in which the cooperating surface is a flat surfaced roller or a moving belt.

9. A sheet moulding machine according to claim 1 in which the roller and/or the adjacent surface are movable in respect to one another.

10. A sheet moulding machine according to claim 1 wherein said adjacent cooperating surface comprises a flat surfaced roller, and wherein in said waveshaped roller the decrease in wavelengths is symmetrical about the mid-point of the longitudinal axis and the waves at each end of the roller have substantially the same wavelength, said waveshaped roller being cut with 5 to 200 grooves, substantially parallel to the longitudinal axis of the roller and disposed across the mid-point of the roller, extending up to two thirds of the distance from the mid-point of the longitudinal axis towards each end of the roller, the depth of the grooves being equal to the amplitude of the waves and contiguous grooves being axially aligned, said rollers being movable in respect to one another and being located so that sheet is able to be extruded between them.

11. A sheet moulding machine which comprises eight pairs of rollers arranged in the order CABABCCC in which each letter represents a pair of rollers, A and B being pairs according to claim 10, C being a pair of flat-surfaced rollers the crests of the waves of rollers A being in substantial axial alignment with the troughs of the waves of rollers B and vice versa.

12. A sheet moulding machine comprising at least one roller and adjacent cooperating surface located so that sheet is able to be extruded between the roller and the surface,
  the surface of the roller being wave-shaped along at least part of its longitudinal axis, the wave lengths decreasing progressively from the mid-point of the longitudinal axis at least part of the way towards each end of the roller, and
  one or more grooves formed in the roller surface substantially parallel to its longitudinal axis.

13. A sheet moulding machine according to claim 12 in which the progressive decrease in wavelength towards each end of the roller is symmetrical about the midpoint of the longitudinal axis.

14. A sheet moulding machine according to claim 12 in which contiguous grooves are axially aligned.

15. A sheet moulding machine according to claim 12 in which the groove(s) are disposed across the midpoint of the roller extending up to two thirds of the distance from the mid-point of the longitudinal axis towards each end of the roller.

16. A sheet moulding machine comprising
  means for providing a homogeneous distribution of components in a plastic sheet to be formed of non-homogeneous material by kneading of the material while forming a sheet therefrom, said means comprising
  at least one roller and adjacent cooperating surface located so that the sheet is able to be extruded between the roller and the surface, and
  the surface of the roller being wave-shaped along at least part of its longitudinal axis, the wavelengths decreasing progressively from the mid-point of the longitudinal axis at least part of the way towards each end of the roller; and
  means for supplying non-homogeneous material to said means for providing a homogeneous distribution while forming a plastic sheet.

* * * * *